United States Patent
Calabrese (10) Patent No.: US 7,665,358 B2
(45) Date of Patent: Feb. 23, 2010

(54) SELF-CALIBRATING LIQUID LEVEL TRANSMITTER

(75) Inventor: Ronald V. Calabrese, Addison, IL (US)

(73) Assignee: Lumenite Control Technology, Inc., Franklin Park, IL (US)

(*) Notice: Subject to any disclaimer, the term of this patent is extended or adjusted under 35 U.S.C. 154(b) by 0 days.

(21) Appl. No.: 12/271,589

(22) Filed: Nov. 14, 2008

(65) Prior Publication Data

US 2009/0064757 A1   Mar. 12, 2009

Related U.S. Application Data

(62) Division of application No. 11/851,835, filed on Sep. 7, 2007, now Pat. No. 7,461,550, which is a division of application No. 11/423,090, filed on Jun. 8, 2006, now Pat. No. 7,284,427.

(60) Provisional application No. 60/595,135, filed on Jun. 8, 2005.

(51) Int. Cl.
    *G01F 23/00* (2006.01)
(52) U.S. Cl. .................. 73/304 R; 73/290 R; 73/304 C
(58) Field of Classification Search ............... 73/304 C, 73/304 R
    See application file for complete search history.

(56) References Cited

U.S. PATENT DOCUMENTS

| | | |
|---|---|---|
| 3,392,581 A | 7/1968 | Miller |
| 3,555,221 A | 1/1971 | Booth |
| 3,781,498 A | 12/1973 | Kamil et al. |
| 3,781,858 A | 12/1973 | Lewis |
| 3,798,515 A | 3/1974 | DiGiacomo |
| 3,820,098 A | 6/1974 | Demyon et al. |
| 3,849,771 A | 11/1974 | Applin |
| 3,857,004 A | 12/1974 | Kavthekar et al. |
| 3,862,571 A | 1/1975 | Vogel |
| 3,901,079 A | 8/1975 | Vogel |
| 3,935,739 A | 2/1976 | Ells |
| 3,939,360 A | 2/1976 | Jackson |
| 3,944,844 A | 3/1976 | Innes |
| 3,969,941 A | 7/1976 | Rapp |
| 4,003,259 A | 1/1977 | Hope |
| 4,056,979 A | 11/1977 | Bongort et al. |

(Continued)

Primary Examiner—Hezron Williams
Assistant Examiner—Rodney T Frank
(74) Attorney, Agent, or Firm—Vedder Price P.C.

(57) ABSTRACT

The present disclosure generally relates to a capacitance sensing apparatus equipped with self-calibrating capacity and method of use thereof. The disclosure contemplates the determination using a secondary means of precise fluid levels according to five possible embodiments, and the use of the determined fluid level to recalibrate the capacitance sensing apparatus along its continuous analog level, namely, a variation of the thickness of the insulation of a capacitance sensing apparatus, the variation of the surface geometry of the capacitance sensing apparatus, the use of a dual-probe sensor including a probe with a varied surface geometry, the use of an electromagnetic sensor adjoining the capacitance sensor, and the variation of the electromechanical sensor to serve as a capacitance sensing apparatus. The disclosure also contemplates methods for using the sensing apparatus previously disclosed to measure a fluid level using a self-calibrating capacitance sensing apparatus. Finally, the present disclosure contemplates the use of an improved mathematical method associated with a variability measurement, such as an exponential smoothing method, to determining locally discrete changes in the variability measurement of the capacitance in order to determine a fixed fluid level.

30 Claims, 11 Drawing Sheets

U.S. PATENT DOCUMENTS

| | | | |
|---|---|---|---|
| 4,064,755 A | 12/1977 | Bongort et al. | |
| 4,082,930 A | 4/1978 | Peeples | |
| 4,122,718 A | 10/1978 | Gustafson | |
| 4,139,750 A | 2/1979 | Rau | |
| 4,178,623 A | 12/1979 | Emmerich et al. | |
| 4,186,419 A | 1/1980 | Sims | |
| 4,194,395 A | 3/1980 | Wood | |
| 4,204,427 A | 5/1980 | Gothe et al. | |
| 4,212,202 A * | 7/1980 | Schmidt | 73/304 C |
| 4,253,064 A | 2/1981 | McBride, Jr. | |
| 4,270,033 A | 5/1981 | Hoffman | |
| 4,295,370 A | 10/1981 | Bristol | |
| 4,296,472 A | 10/1981 | Sarkis | |
| 4,356,729 A | 11/1982 | Kubota et al. | |
| 4,388,828 A | 6/1983 | Dougherty | |
| 4,417,472 A | 11/1983 | Tward | |
| 4,417,473 A * | 11/1983 | Tward et al. | 73/304 C |
| 4,425,795 A * | 1/1984 | Albrecht et al. | 73/295 |
| 4,428,232 A | 1/1984 | Tanaka et al. | |
| 4,467,156 A | 8/1984 | Dvorak et al. | |
| 4,467,646 A | 8/1984 | Berryman et al. | |
| 4,506,258 A | 3/1985 | Charboneau et al. | |
| 4,512,067 A | 4/1985 | Kobayashi | |
| 4,528,839 A | 7/1985 | Blanchard et al. | |
| 4,589,077 A * | 5/1986 | Pope | 702/52 |
| 4,594,892 A | 6/1986 | Asmundsson | |
| 4,594,893 A | 6/1986 | Lombard et al. | |
| 4,626,700 A | 12/1986 | Tanaka et al. | |
| 4,628,302 A | 12/1986 | Barr et al. | |
| 4,636,714 A | 1/1987 | Allen | |
| 4,646,569 A | 3/1987 | Cosser | |
| 4,658,207 A | 4/1987 | Scribano et al. | |
| 4,661,768 A | 4/1987 | Carusillo | |
| 4,674,329 A * | 6/1987 | Mulder | 73/304 C |
| 4,730,489 A | 3/1988 | Hoekstra | |
| 4,736,638 A | 4/1988 | Okawa et al. | |
| 4,745,893 A | 5/1988 | Atherton et al. | |
| 4,786,857 A * | 11/1988 | Mohr et al. | 73/304 R |
| 4,788,488 A | 11/1988 | Kramer et al. | |
| 4,796,473 A | 1/1989 | Custer | |
| 4,806,847 A | 2/1989 | Atherton et al. | |
| 4,811,160 A | 3/1989 | Fleckenstein | |
| 4,820,973 A | 4/1989 | Alvarez | |
| 4,845,486 A * | 7/1989 | Knight et al. | 340/618 |
| 4,875,497 A | 10/1989 | Worthington | |
| 4,879,902 A | 11/1989 | Loniello | |
| 4,888,989 A | 12/1989 | Homer | |
| 4,947,689 A | 8/1990 | Hochstein | |
| 4,950,998 A | 8/1990 | Kramer et al. | |
| 4,965,555 A | 10/1990 | Huttenbergr et al. | |
| 4,981,039 A | 1/1991 | Hayashi et al. | |
| 4,982,606 A | 1/1991 | Adamski et al. | |
| 4,994,749 A | 2/1991 | Davies et al. | |
| 5,001,596 A | 3/1991 | Hart | |
| 5,001,927 A | 3/1991 | LaCava et al. | |
| 5,005,409 A | 4/1991 | Hochstein | |
| 5,016,442 A | 5/1991 | Zander et al. | |
| 5,017,909 A | 5/1991 | Goekler | |
| 5,026,954 A | 6/1991 | Cebulski | |
| 5,042,299 A | 8/1991 | Wells | |
| 5,045,797 A | 9/1991 | Kramer et al. | |
| 5,050,431 A * | 9/1991 | McDonald | 73/304 C |
| 5,051,921 A | 9/1991 | Paglione | |
| 5,052,223 A | 10/1991 | Regnault et al. | |
| 5,074,988 A * | 12/1991 | Nyberg et al. | 204/418 |
| 5,103,368 A * | 4/1992 | Hart | 361/284 |
| 5,103,672 A | 4/1992 | Terry, Jr. et al. | |
| 5,122,922 A | 6/1992 | Richeson | |
| 5,135,485 A | 8/1992 | Cohen et al. | |
| 5,182,545 A | 1/1993 | Goekler et al. | |
| 5,187,979 A | 2/1993 | Edmark, III | |
| 5,253,521 A | 10/1993 | Abramovich et al. | |
| 5,278,513 A | 1/1994 | Kramer et al. | |
| 5,294,917 A | 3/1994 | Wilkins | |
| RE34,601 E | 5/1994 | Hochstein | |
| 5,315,872 A | 5/1994 | Moser | |
| 5,397,995 A | 3/1995 | Anderson | |
| 5,421,210 A | 6/1995 | Kobayashi et al. | |
| 5,437,184 A | 8/1995 | Shillady | |
| 5,446,444 A | 8/1995 | Lease | |
| 5,554,937 A | 9/1996 | Sanders et al. | |
| 5,562,132 A | 10/1996 | Siegele et al. | |
| 5,590,695 A | 1/1997 | Siegele et al. | |
| 5,607,002 A | 3/1997 | Siegele et al. | |
| 5,611,240 A | 3/1997 | Yamaguchi | |
| 5,623,252 A | 4/1997 | Cacciola et al. | |
| 5,627,522 A | 5/1997 | Walker et al. | |
| 5,627,523 A | 5/1997 | Besprozvanny et al. | |
| 5,711,354 A | 1/1998 | Siegele et al. | |
| 5,722,290 A | 3/1998 | Kronberg | |
| 5,726,908 A | 3/1998 | Hosmer et al. | |
| 5,745,377 A | 4/1998 | Power et al. | |
| 5,747,689 A | 5/1998 | Hampo et al. | |
| 5,790,422 A | 8/1998 | Power et al. | |
| 5,860,316 A | 1/1999 | Berrill | |
| 5,901,633 A | 5/1999 | Chan et al. | |
| 5,945,831 A | 8/1999 | Sargent et al. | |
| 6,016,697 A | 1/2000 | McCulloch et al. | |
| 6,073,488 A | 6/2000 | Byatt et al. | |
| 6,101,873 A | 8/2000 | Kawakatsu et al. | |
| 6,107,810 A | 8/2000 | Ishizawa et al. | |
| 6,178,818 B1 | 1/2001 | Plochinger | |
| 6,269,694 B2 | 8/2001 | Morimoto | |
| 6,293,145 B1 | 9/2001 | Wallrafen | |
| 6,318,172 B1 | 11/2001 | Byatt et al. | |
| 6,362,632 B1 | 3/2002 | Livingston | |
| 6,380,750 B1 * | 4/2002 | Schenck et al. | 324/690 |
| 6,413,475 B2 | 7/2002 | Ishizawa et al. | |
| 6,457,355 B1 | 10/2002 | Philipp | |
| 6,529,017 B2 | 3/2003 | Martin et al. | |
| 6,539,797 B2 | 4/2003 | Livingston et al. | |
| 6,634,229 B1 * | 10/2003 | Kazkaz et al. | 73/304 R |
| 6,761,067 B1 * | 7/2004 | Capano | 73/304 C |
| 6,823,730 B2 | 11/2004 | Buck et al. | |
| 6,857,313 B2 * | 2/2005 | Williamson | 73/304 C |
| 6,869,708 B2 | 3/2005 | Kelley et al. | |
| 7,284,427 B2 * | 10/2007 | Calabrese | 73/304 R |
| 7,461,550 B2 * | 12/2008 | Calabrese | 73/304 R |
| 2003/0121325 A1 | 7/2003 | Ku et al. | |
| 2003/0233875 A1 | 12/2003 | Stehman et al. | |
| 2004/0036618 A1 | 2/2004 | Ku et al. | |
| 2005/0039420 A1 | 2/2005 | Albritton et al. | |
| 2006/0090552 A1 * | 5/2006 | Ziegler et al. | 73/118.1 |

* cited by examiner

SELF-CALIBRATING LIQUID LEVEL TRANSMITTER

RELATED APPLICATIONS

This application is a divisional of U.S. patent application Ser. No. 11/851,835, filed on Sep. 7, 2007, which application is a divisional of U.S. patent application Ser. No. 11/423,090, filed on Jun. 8, 2006, now U.S. Pat. No. 7,284,427 issued on Oct. 23, 2007 which application claims the benefit of U.S. Provisional Application No. 60/595,135, filed on Jun. 8, 2005.

FIELD OF THE DISCLOSURE

This disclosure relates to a self-calibrating capacitance fluid level sensing apparatus and method of use thereof, and more particularly, to an analog capacitance fluid level sensing apparatus further calibrated at fixed fluid levels with a signal from either a variable thickness in the insulated capacitance probe, a variable geometry of the capacitance probe, an input from an adjoining electromechanical sensor, or an input from a joined electromechanical sensor.

BACKGROUND

Varied technologies exist to measure fluid levels in containers. These technologies include but are not limited to mechanical sensors, electromechanical sensors, radar sensors, visual sensors, weight sensors, laser sensors, ultrasonic sensors, and capacitance sensors. Fluid characteristics such temperature, viscosity, conductivity, chemical abrasiveness, acidity, and the like may vary during the measurement of sensors from one level to a second level. These variations may offset measures from a sensor relying on a fixed characteristic to determine a precise level in a container. For example, if a mechanical sensor determines the level of a fluid by first measuring the weight in a known container geometry and associated the first weight on a fluid level based on calculations of the volumetric density of the fluid, once the fluid temperature increases, the volumetric density may decrease, raising the level above the calculated value. For this reason, analogous measures performed over a long period of time require recalibration to actual measured levels.

Fluids such as water are known to serve as proper electrical conductors. If a body of water placed between insulated plates is energized at a certain voltage (V) under the strain from the resulting dielectric force field, a conductive fluid is charged (Q). The capacitance (C) of a fluid is a measure of the amount of electricity stored in a fluid volume divided by the potential of the body. The general formula for the determination of capacitance is $C=Q/V$. The determination of a capacitance (C) when applied to known geometries can be shown to respond to the following equation: $C=kA/d$, where k is the dielectric constant of the fluid between plates, A is the cross-sectional area of the plates, and d is the distance between the plates. It is understood by one of ordinary skill in the art that correction factors must be applied to the calculation of any capacitance with plates and surfaces of irregular geometries.

Capacitance sensors consist of either placing two polarized bodies at a fixed voltage (V), often insulated in a conductive fluid, or placing a single insulated body within another body and using the general conductive container of the fluid as a pole of the dielectric force field. As the water level rises in the container, not only does the available capacitive volume increase, the contact surface of the fluid with the polarized bodies increase accordingly.

Capacitance sensors are used in a wide range of environments, including at extreme temperature or in toxic environment, since they require no moving parts and are resistant to vibration, even absent a gravitational field. For example, cryogenic fuel levels on spacecraft are measured by capacitance sensors. Capacitance sensors are inherently vulnerable to changes in fluid characteristics since the dielectric constant of fluids may vary greatly with temperature, chemical composition, pollutants, segregation, phase changes, and other fluid characteristics. For example, the presence of salt or the formation of blocks of ice in a body of water can dramatically affect its measure of capacitance and ultimately the fluid level determined by a capacitance sensor. Detection based on capacitance is also limited by nonintrusive size sensors with limited surface area and the need to measure at low voltage levels. Capacitance sensors often operate at minimal detection levels and require redundant measures in order to determine a level within a limited margin of error.

Therefore, there is a need in the art for a capacitance sensor able to self-calibrate along its analog range of measurement at certain fixed fluid levels in order to limit the uncertainties associated with inherent limitations of this type of sensor.

SUMMARY

The present disclosure generally relates to a capacitance sensing apparatus and method of use thereof equipped with self-calibrating capacity. The disclosure contemplates the determination using a secondary means of precise fluid levels according to a plurality of possible embodiments and the use of the determined fluid level to recalibrate the capacitance sensing apparatus along its continuous analog measure.

In one embodiment of the present disclosure, the thickness of the insulation of a capacitance body is varied along a precise function along its vertical axis. The variations at determined levels creates a change in the variability measurement of the capacitance of the fluid leading to a recalibrating level for the capacitance sensor. In another embodiment of the present disclosure, the surface geometry of the capacitance body is varied along a precise function along its vertical axis. The variations at determined levels also create a change in the variability measurement of the capacitance of the fluid and can be used to recalibrating the level for a capacitance sensor measure. In another embodiment of the present disclosure, a dual-sensor body is used where a third body has a varied surface geometry along a precise function along its vertical axis while a first body has a regular surface geometry. Variations in the capacitance variability measurement between both bodies are used to recalibrate the measure from the first body. In another embodiment of the present disclosure, an electromagnetic sensor is used together with the capacitance sensor to measure predetermined fluid levels. In another embodiment of the present disclosure, the main guide of an electromechanical sensor is modified to allow a guide to serve as a capacitance sensing apparatus recalibrated by the electromechanical sensor.

The disclosure also contemplates methods for using the sensing apparatus previously disclosed to measure a fluid level using a self-calibrating capacitance sensing apparatus. Finally, the present disclosure also contemplates the use of an improved mathematical method associated with a variability measurement, such as an exponential smoothing method to determine locally discrete changes in the variability measurement of the capacitance in order to determine a fixed fluid level.

BRIEF DESCRIPTION OF THE DRAWINGS

Certain embodiments are shown in the drawings. However, it is understood that the present disclosure is not limited to the arrangements and instrumentality shown in the attached drawings.

DETAILED DESCRIPTION

For the purposes of promoting and understanding the principles disclosed herein, reference is now made to the preferred embodiments illustrated in the drawings and specific language is used to describe the same. It is nevertheless understood that no limitation of the scope is thereby intended. Such alterations and further modifications in the illustrated devices and such further applications of the principles disclosed as illustrated herein are contemplated as would normally occur to one skilled in the art to which this disclosure relates.

Figure 1:
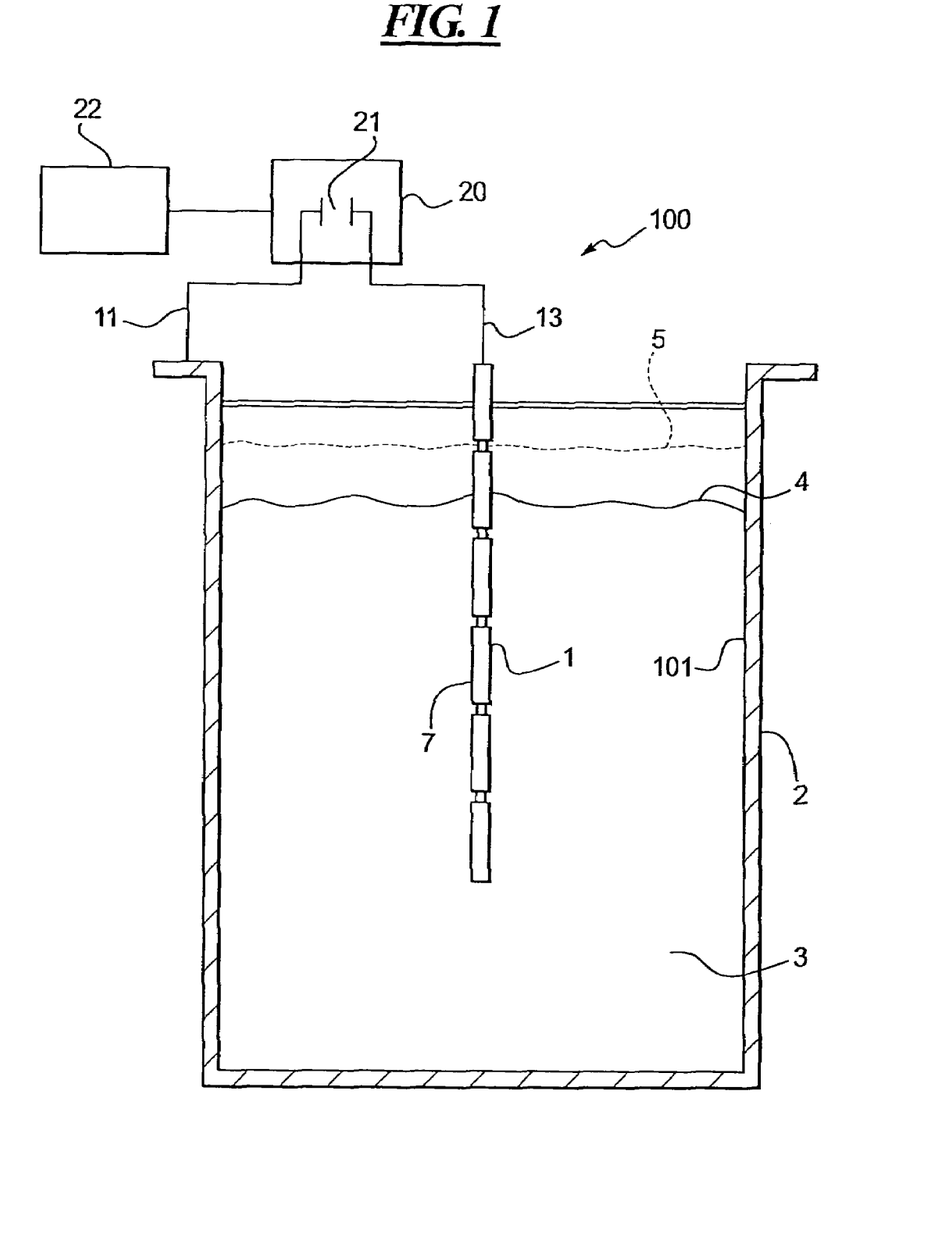
FIG. 1 is a functional side view of the self-calibrating capacitance fluid level sensing apparatus according to one embodiment of the present disclosure.
Figures 2, 3, 4:
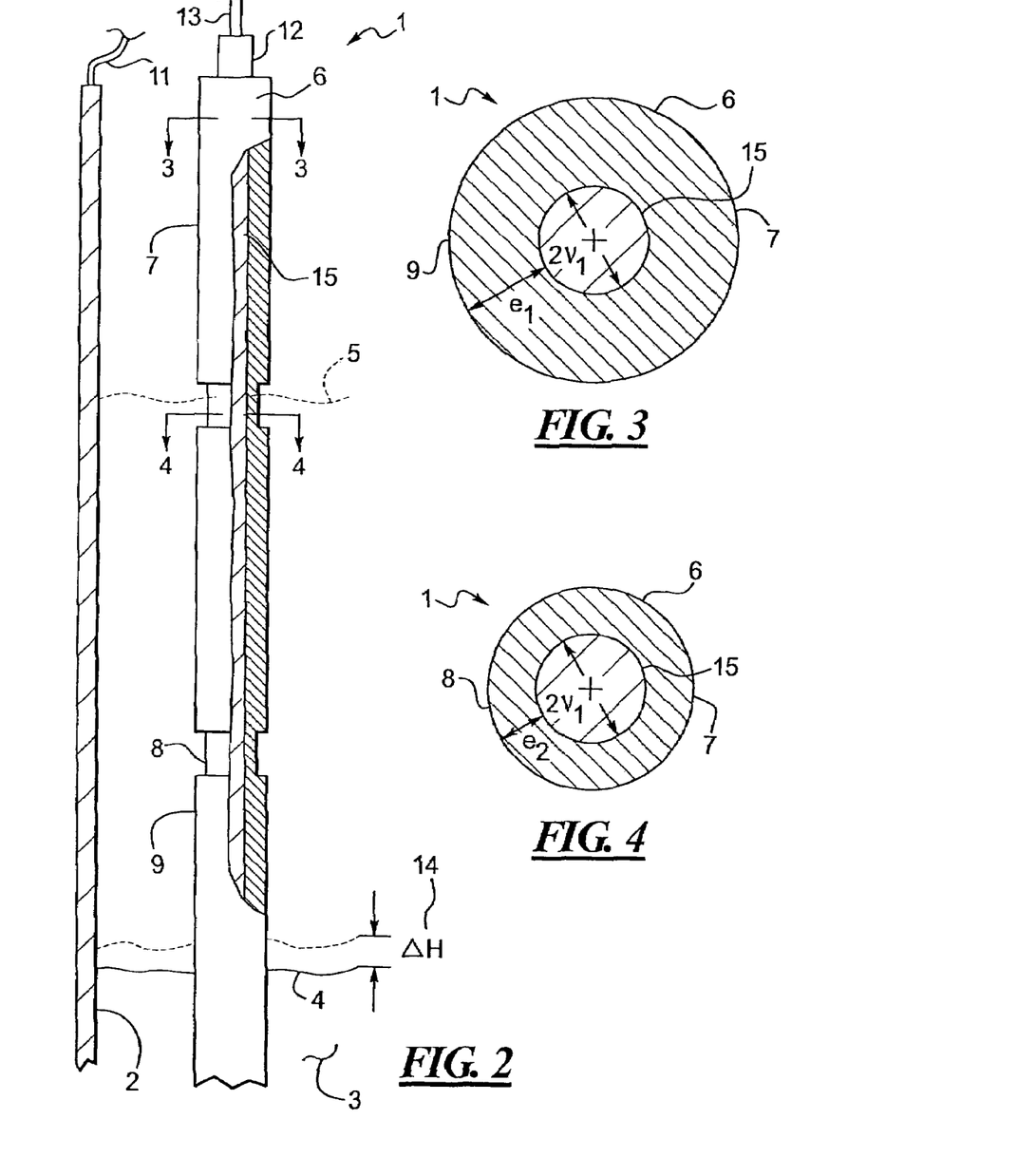
FIG. 2 is a partial functional view of the sensor element of the self-calibrating capacitance fluid level sensing apparatus of FIG. 1.
FIG. 3 is a top sectional view of FIG. 2 along line 3-3.
FIG. 4 is a top sectional view of FIG. 2 along line 4-4 according.

FIG. 1 is a functional side view of the self-calibrating capacitance fluid level sensing apparatus according to a first and second embodiment of the present disclosure. The first contemplated embodiment of the sensing apparatus to be placed in a container includes a sensor 100 with a first body 1 made of electrically conductive material, a layer of insulating material 7 as shown in FIG. 2 of a thickness e1 or e2 shown in FIGS. 3-4. The insulating material 7 is placed over the first body 1 covering a first surface contact area 15 shown in FIG. 2. The sensor 100 also comprises a second body 2 with a second surface contact area 101 made of electrically conductive material placed in opposition to the first body 15.

In one embodiment, the second body 2 is a container and the second surface contact area 101 is the inside portion of a stainless steel container, reservoir, or vat without surface insulation. It is understood by one of ordinary skill in the art that in order to create a difference in potential and voltage between the first body 1 and the second body 2, it is possible to ground the second body and place the first body 1 at the desired voltage in order to prevent the need for use of electrical insulation on the inner surface 101 of the second body 2. The conductive material of the first body 1 and the second body 2 in a preferred embodiment is made of stainless steel, but it is understood by one of ordinary skill in the art that any conductive material or metal may be used.

The sensor 100 is located inside a container progressively filled with a fluid 4 in order to change the fluid level from a first position 4 to a second higher position 5. It is understood by one of ordinary skill in the art that any fluid including a dry powder based or particular based medium with a minimal level of conductivity can be used as a fluid in the scope of this disclosure. FIG. 2 illustrates an incremental change in fluid level from a first position 4 to a new position 14 quantified shown as ΔH where it is understood by one of ordinary skill in the art that the symbol Δ corresponds to a mathematical differential variation delta of height H in the fluid level. Associated with this incremental change is an incremental change in the contact surface of the fluid 3 with the contact surfaces 7, 101 of first body 1 and the second body 2, respectively. The fluid 3 conductively connects a first fraction of the first surface contact area 7 on the layer of insulating material 6 to a second fraction of the second surface contact area 101. It is understood by one of ordinary skill in the art that in the disclosed embodiment, the second body 2 acts as the container and is progressively filled with the fluid 4. It is also understood that the first and second fractions of the first and second surface contact areas 7 as applied by projection to the insulating material 6 and the second surface contact area 101 correspond to the surface in contact with the fluid 3 located below the level 4. In the case of an increase in the level of fluid 3 by ΔH, each of the first and second fractions of the first surface contact area 7 as applied by projection to the insulating material 6 and the second surface contact area 101 is increased by an incremental surface of height H multiplied by a wet diameter of each surface contact area 6 and 101.

Returning to FIG. 1, the sensor 100 further includes a means 21 for energizing the first body 1 and the second body 2 at a voltage V. In one embodiment, the first body 1 is connected via a conductor cable 13 to a power source 21 able to apply and modulate a voltage V between two conductors bodies 1, 2. The second body 2 is also connected to the power source 21 by a second conductor cable 11. It is understood by one of ordinary skill in the art that the induction of voltage between two conductive bodies in association with different connectors can be made by a very wide range of means associated with the generation and transportation of current and ultimately voltage between bodies as known in the art. By way of nonlimiting example, portable power sources such as batteries, magnetically induced currents, piezoelectric currents, current generators, network-transported stabilized currents, static friction generators, wave-based electron excitation, wave based transportation of current like microwave, chemically induced currents, or even induction currents may be used as proper means to energize bodies. It is understood that while these features are described, they are applicable to associated features on other embodiments.

The sensor 100 further comprises a means 20 for detecting the variability in voltage as the level of fluid 4 or 5 in the container changes by ΔH. The means for detecting a variability of voltage may be an electronics-based circuitry used to precisely measure a voltage, such as a potentiometer. The voltage source 21 and the associated voltage variability measurement means 20 may also include related systems such as current monitoring systems and magnetic field monitoring systems. The sensor 100 may also include a system 22 for the calculation and determination of fixed fluid levels in the container. This system 22 is applicable to all contemplated embodiments found in the present disclosure.

The sensor 100 is also equipped with a variable thickness e1 or e2 of insulating material 6 that varies along the first surface contact area 7 as the level of fluid in the container changes. FIG. 3 shows a sectional view of part of the first body 1 where the thickness of the insulation is e1, and FIG. 4 shows a sectional view of part of the first body 1 where the thickness of the insulation is e2. As a result, forced variations in the voltage 21 detected by the means 20 for detecting the variability of the voltage are observed as the contact area varies from a changing fluid level 4 increases by ΔH.

To further enable the specification, it is understood by one of ordinary skill in the art that if the first body 1 as described in the prior art has a regular surface geometry and a constant thickness of insulation along its length, the variability in capacitance measured by the means for measuring the variability of the capacitance would change along a first slope. A change to the surface contact area in a section of the first body 1 in contact with the water results in a change in the slope of the variability of the capacitance since the contact surface area A is changed over a section of the first body 1. If the fluid level rises along a first section 9 of the first body 1, then a first level of variability and a first slope is measured. Once the fluid level rises along a second section with a different contact surface 8, the level of variability changes and a second slope is measured. The system 22 recognizes the changes in slopes and determines junction points where the first body changes contact surfaces 8, 9. These junction points correspond with precise heights used to recalibrate the capacitive sensor 100 at these heights in order to reduce any offset resulting from a long analogous measure and slow change in the fluid characteristics.

In one embodiment, the change in the first body surface 7 evolves along the length of the body according to a step function. A step function is defined as a vertical line along the length of first body 1 where sections of smaller resulting diameters 8 alternate with sections of larger resulting diameters 9. The step function corresponds to a series of alternating fixed plateaus of two different radii as shown in FIGS. 3-4. It is understood by one of ordinary skill in the art that while step functions and plateau regions are disclosed, any variation in the surface sufficient to influence the variability of the capacitance measured by the means 20 for detecting the variability is proper and contemplated, including but not limited to grooves, fins, other functions, and even different frictions and surface finishes.

The size of the steps in the step function is also to be viewed as a function of the measured variability of the capacitance in a certain system with a certain type of fluid. As a nonlimiting example, if a more conductive fluid is used, such as sea water, the thickness variation between two successive sections (e1-e2) may be reduced and the steepness of change between two plateaus in the step function may also be milder. In one embodiment, the first section 9 or the successive high sections as shown in FIG. 2 are 4 inches long and the second sections 8 are 7/16 inches or 1/2 inch long. It is understood by one of ordinary skill in the art that the ensuing quantity of step functions depends on the useful length of the first body 1 in the fluid 3.

In a preferred embodiment, the insulating material 6 is made of polytetrafluoethylene resins manufactured by DuPont® (Teflon®) or a Teflon®-like coating, but it is understood by one of ordinary skill in the art that the nature and chemical composition of the proper insulating material 6 used depends on the nature and characteristics of the fluid. As a nonlimiting example, if the sensor 100 is used in liquid nitrogen, a very cold fluid, the insulation must maintain its insulating properties, not become brittle, and prevent the formation of surface phase accumulation. The insulator in one preferred embodiment is designed not to accumulate particles or debris upon its surface and to not react with the fluid over long periods of exposure. In all preferred embodiments, the fluid is water or a water-based compound with proper conductive characteristics. The first body may be of cylindrical shape and made of stainless steel, but it is understood by one of ordinary skill in the art that any geometry may be used for the first body 1.

The means for detecting the variability in voltage 20 may include the use of a mathematical algorithm optimized to better determine a change in the slope of the measured variability in the capacitance. In a preferred embodiment, the calculation and method for determining if a change in slope comprises the use of exponential smoothing method to determine the changes associated with a fixed fluid level, wherein the fixed level is used to calibrate the fluid level sensing apparatus. The exponential smoothing method consists of a series of means calculation wherein time-sensitive sample data points are taken during changes in the variability in the capacitance and a slope for any new point is calculated and compared with the measured data point to reveal a change in slope. One of ordinary skill in this art recognizes that while a single method for determination and evaluation of the different slopes and their associated junction points is described, all other currently used methods of calculation are contemplated.

Figures 5, 6, 7:
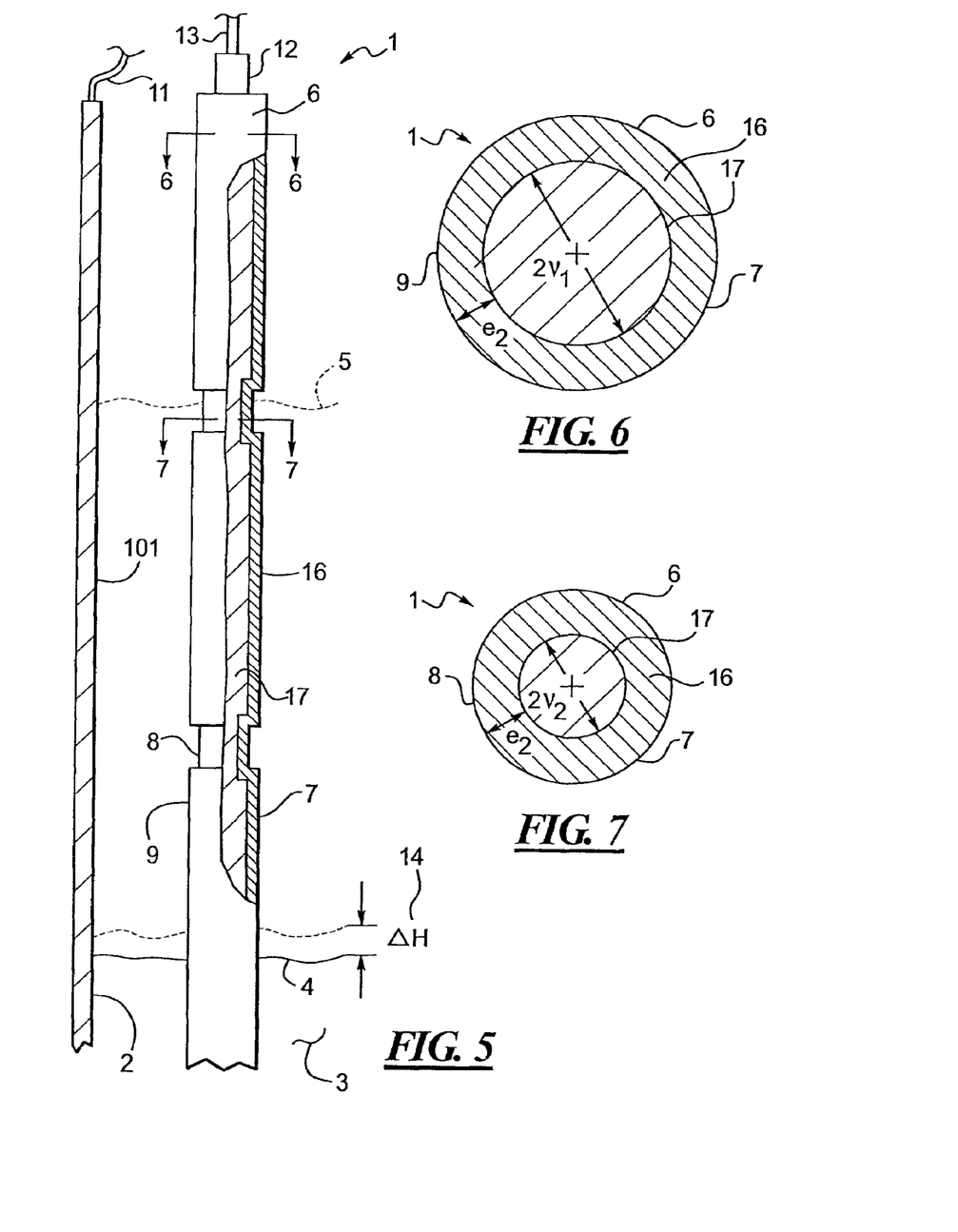
FIG. 5 is a partial functional view of the sensor element of the self-calibrating capacitance fluid level sensing apparatus of FIG. 1.
FIG. 6 is a top sectional view of FIG. 5 along line 6-6.
FIG. 7 is a top sectional view of FIG. 5 along line 7-7.

In another embodiment illustrated in FIG. 5, the insulation layer 16 remains constant along the first body 1. The surface 17 of the first body 1 varies in radius along its vertical length along a step function alternating from sections with a smaller radius 8 to sections with a larger radius 9. FIG. 1 shows two possible embodiments wherein the resulting change in the surface in contact with the fluid 3 alternates from smaller sections 8 to larger sections 9. FIGS. 6 and 7 further illustrate top sectional views of the first body 1 along plane 6-6 and plane 7-7. It is understood by one of ordinary skill in the art that while a single type of surface geometry is shown, what is contemplated is an effective variation in the contact surface with the fluid 3 by varying the surface geometry 17 of the first body 1 in order to induce a variability in the measured capacitance of the fluid. What is contemplated is any geometry with change in the surface geometry associated that result in a measurable and quantifiable variability in voltage from the variability capacitance measurement.

Figure 8:
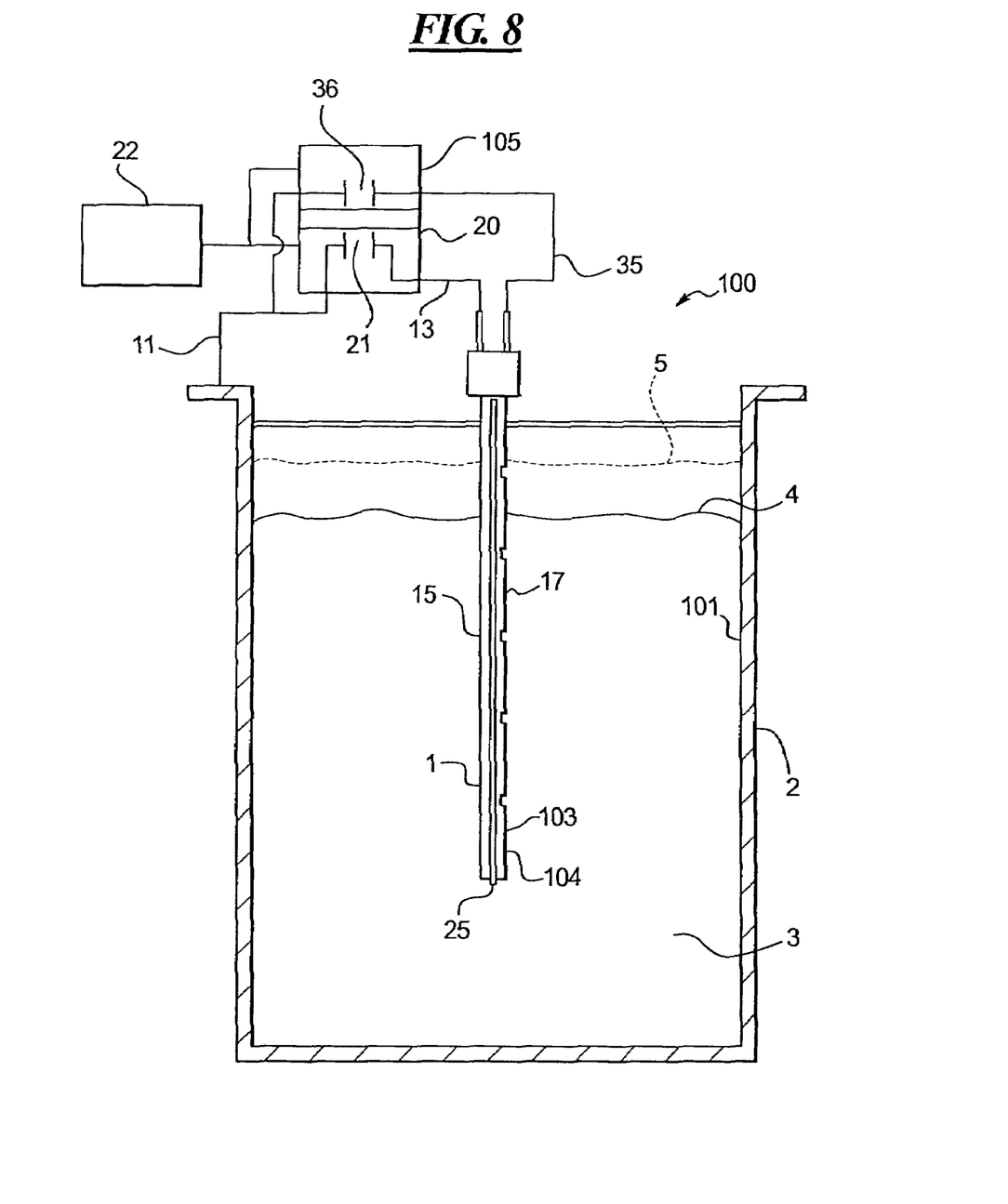
FIG. 8 is a functional side view of a dual-probe self-calibrating capacitance fluid level sensing apparatus according to one embodiment of the present disclosure.

In another possible embodiment as illustrated in FIG. 8, a fluid level sensing apparatus for placement in a container includes a sensor 100 with a first body 1, a first surface contact area 15 made of electrically conductive material, a third body 103 with a third surface contact area 104 made of electrically conductive material, and a second body 2 with a second surface contact area 101 made of electrically conductive material placed in opposition to the first 1 and the third bodies 15. The container is progressively filled with a fluid 3 in order to change the fluid level 4. As in the first and second embodiments, the fluid 3 conductively connects a first fraction of the first surface contact area 15 and a third fraction of the third surface contact area 104 with a second fraction of the second surface contact area 101. The sensor 100 also is equipped with two means 21, 36 for energizing the first body 1 and the third body 103 to the second body 2, a first means 20 for detecting the variability in voltage as the level of fluid in the container changes as the first fraction of the first surface contact area 15 and the second fraction of the second surface contact area 101 changes, and a second means 105 for detecting the variability of voltage 36 as the level of fluid 4 in the container changes as the third fraction of the third surface contact area 104 and the second fraction of the second surface contact area changes 101. The surface geometry of the first body 1 varies along the first, second and third surface contact areas 15, 104, 101 as the level of fluid 4 in the container changes to create forced variations in the voltage for both of the first and second means 20, 105 for detecting the variability of the voltage.

In one embodiment, two bodies 1, 103 are placed in the fluid 3 in opposition to the second body 2. This embodiment allows for the parallel measurement of two different variability of capacitance, a standardized measurement 20 based on a body without any variable geometry irregularities, and a measurement 36 based on a body with variable geometry irregularities designed as described in the embodiment of this disclosure and shown in FIGS. 9-15, respectively. The embodiment shown in FIGS. 9-12 illustrates a situation where the probe is not insulated and is grounded while the voltage potential is placed on the second body 2. In the embodiment shown in FIGS. 13-15, the first and third bodies 1, 103 are insulated 26 with a fixed thickness of insulation e1 as shown on FIGS. 14-15. The two bodies in one embodiment are shaped in a semicircular or semicylindrical vertical rod configuration placed back-to-back and made of stainless steel. The third body 103 such as that described in the second embodiment is made of a variable surface area of a first step of 4-inch width separated by 7/16- or 1/2-inch sections forming a regular step function. While two adjacent bodies are shown, it is understood by one of ordinary skill in the art that any two-body geometry is contemplated as long as the external contact areas are varied appropriately in order to change the overall measure of the capacitance of the sensor 100.

Figure 9:
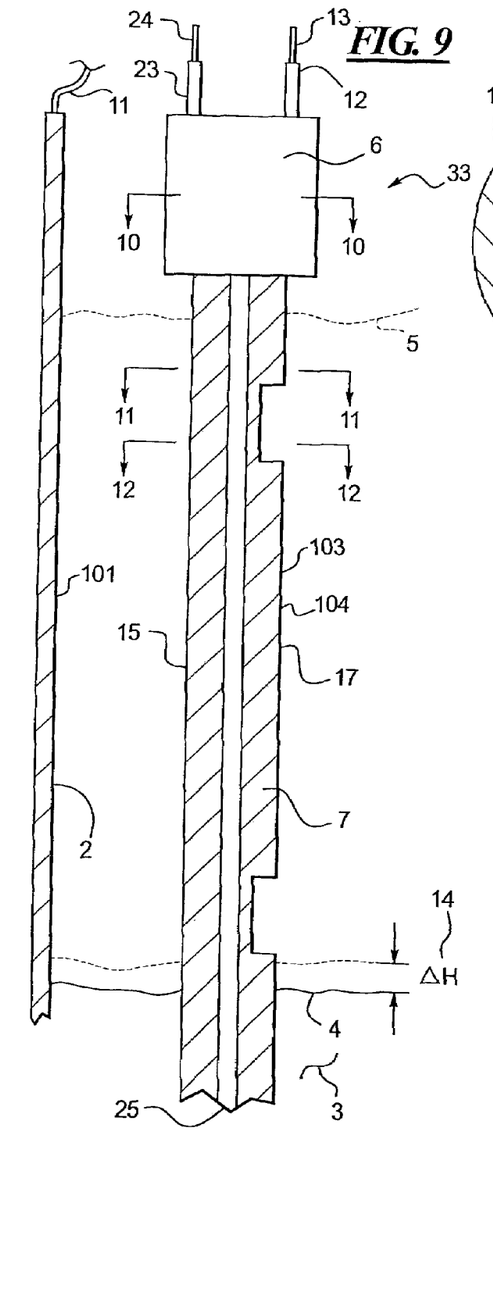
FIG. 9 is a partial functional view of the sensor element of the dual-probe self-calibrating capacitance fluid level sensing apparatus of FIG. 8 without insulation.
Figure 10:
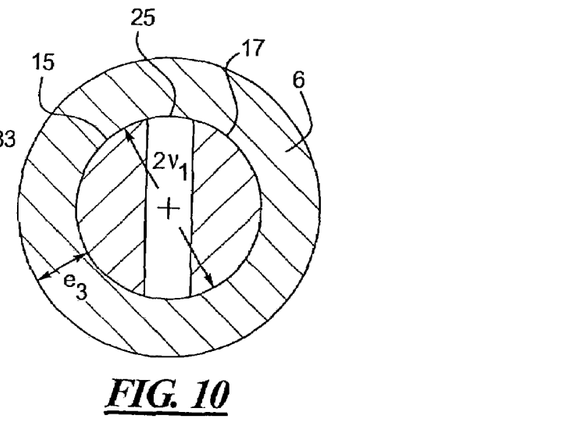
FIG. 10 is a top sectional view of FIG. 9 along line 10-10.
Figure 11:
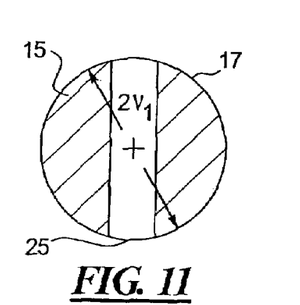
FIG. 11 is a top sectional view of FIG. 9 along line 11-11.
Figure 12:
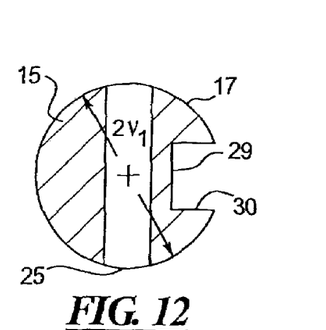
FIG. 12 is a top sectional view of FIG. 9 along line 12-12.
Figure 13:
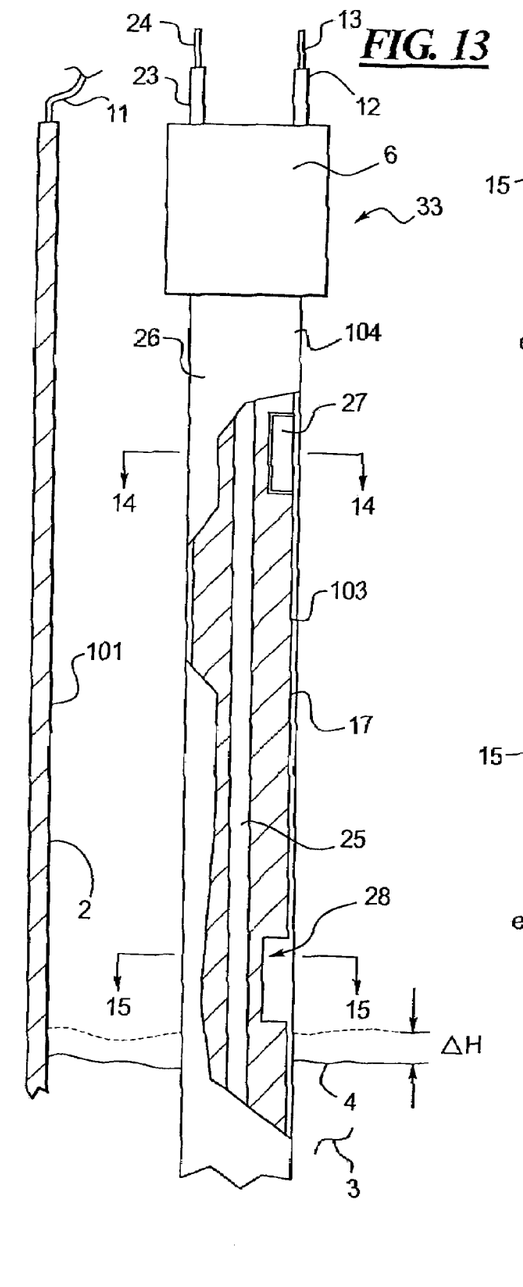
FIG. 13 is a partial functional view of the sensor element of the dual-probe self-calibrating capacitance fluid level sensing apparatus of FIG. 8 with insulation.

A layer of insulation 25 is placed between both the first body 1 and the third body 103. In one embodiment, the insulation is phenolic insulation, but it is understood by one of ordinary skill in the art that while a single type of insulation is disclosed, what is contemplated is an insulation 25 of a type able to effectively insulate two adjacent conductive bodies in a predetermined environment. FIG. 12 shows a cross-section of the third body 103 illustrating notches 30 created in the surface of the semicylindrical third body 103. The choice of notches as shown in FIG. 9 corresponds in some orientation to the step function as previously disclosed in the first and second embodiments. In one embodiment, the notches are of a fixed width and fixed height with a flat bottom portion 29 in order to better calibrate the means for measuring the variability of the capacitance 105. It is understood by one of ordinary skill in the art that the third embodiment allows for the self-calibration of the sensor 100 by comparing the variability of capacitance from the first means 20 with the variability of capacitance from the second means 105. It is also understood that in an alternate embodiment, the first body 1, if placed in opposition to the third body 103, may lead to self-calibration without the second body 2 by placing the means for applying a voltage difference between both the first body 1 and the third body 103 and appropriately correcting the surface area calculations.

Figure 14:
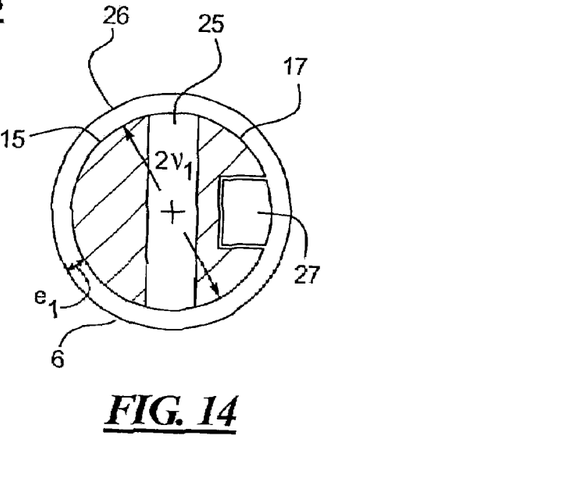
FIG. 14 is a top sectional view of FIG. 13 along the 14-14.
Figure 15:
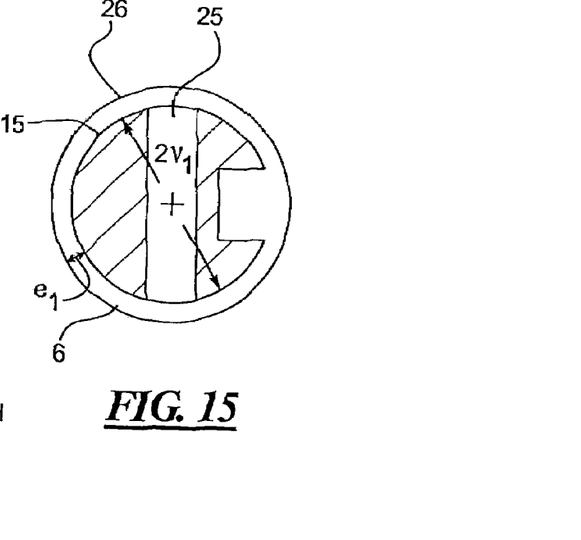
FIG. 15 is a top sectional view of FIG. 13 along the 15-15.

In certain embodiments, the means for detecting the variability in voltage between the first second body 2 and the third body 103 may include the use of an exponential smoothing method to determine the changes associated with a fixed fluid level, wherein the fixed level is used to recalibrate the fluid level sensing apparatus as disclosed in the first and second embodiments. In another embodiment as shown in FIG. 14, an insulating block 27 is placed in a notch in order to better regulate the variability of the capacitance.

Figure 16:
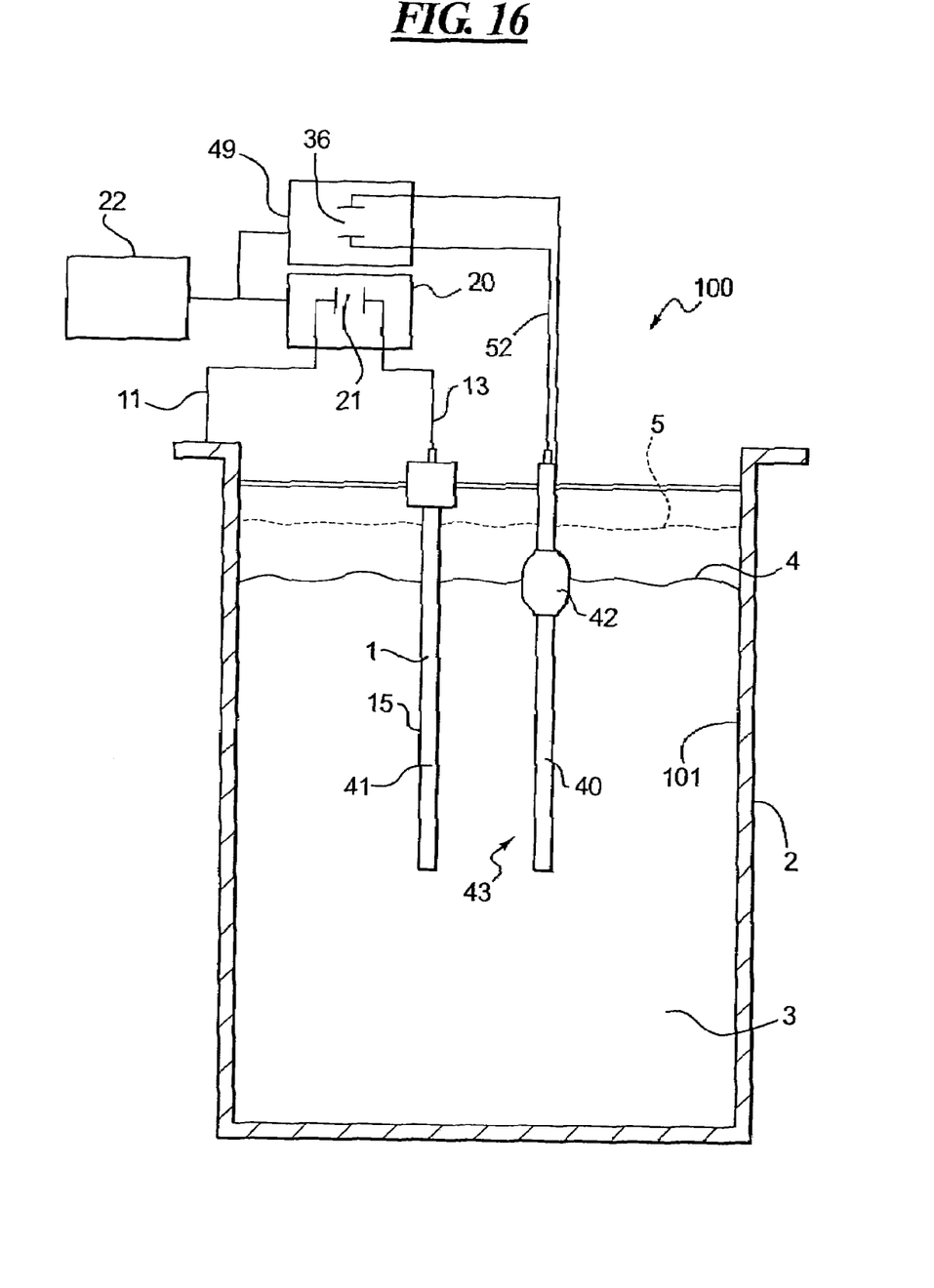
FIG. 16 is a functional side view of the self-calibrating capacitance fluid level sensing apparatus and electromechanical sensing apparatus according to one embodiment of the present disclosure.
Figures 17, 18:
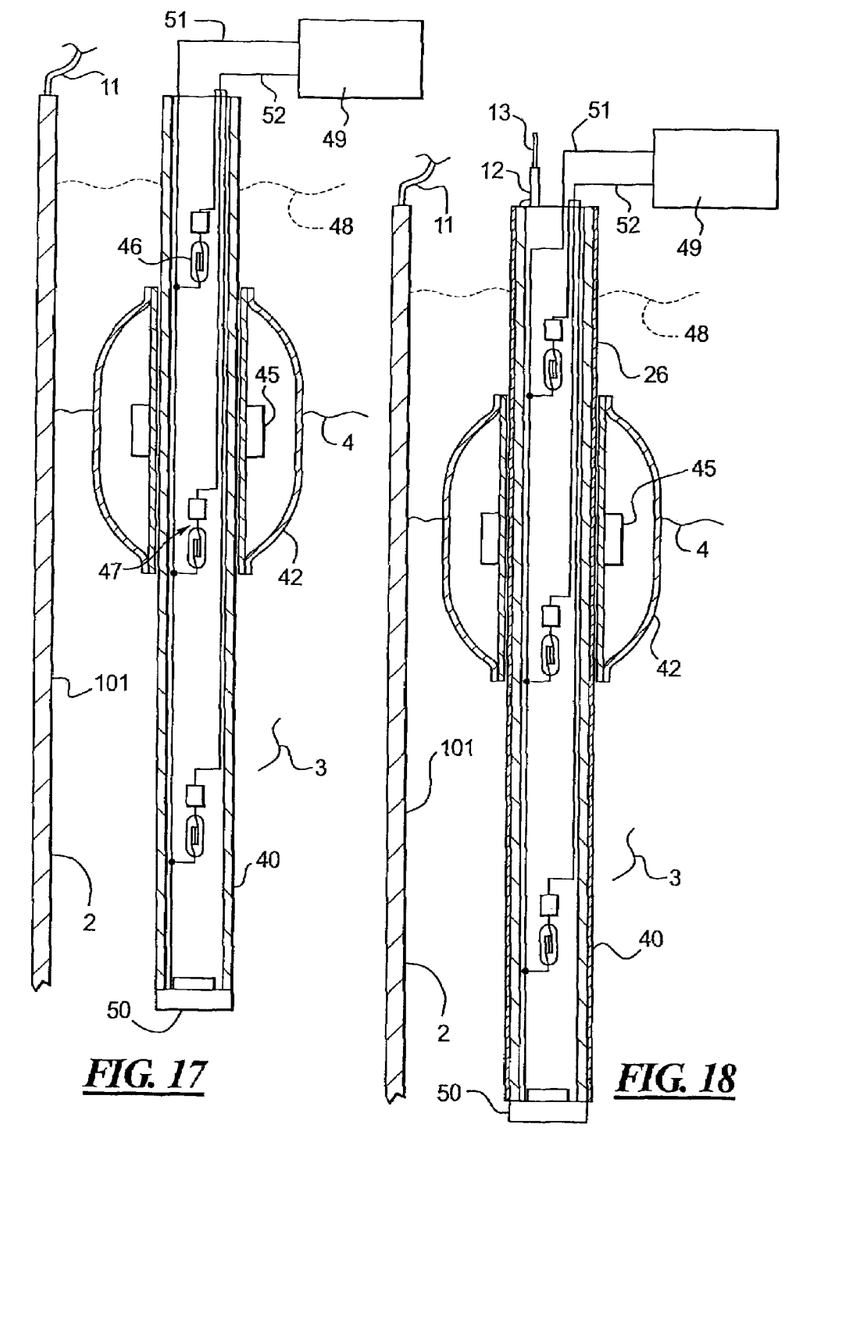
FIG. 17 is a partial side view of the electromechanical sensing apparatus of FIG. 15.
FIG. 18 is a partial side view of the electromechanical sensing apparatus with a capacitance sensing apparatus according to one embodiment of the present disclosure.

In another embodiment illustrated in FIG. 16, a fluid level sensing apparatus for placement in a container comprises a capacitance sensor 41 further comprising a first body 1 with a first surface contact area 15 made of electrically conductive material, a second body 2 with a second surface contact area 101 made of electrically conductive material placed in opposition to the first body 1, an electromechanical sensor 43 further comprising a guide 40 positioned in a fluid 3 to be measured, a float 42 mechanically connected to the guide 40 for longitudinal movement thereon to rise and fall with the fluid level 4, a series of reed switches 47 shown in FIG. 17 placed at fixed intervals along the guide 40, and a means for establishing a magnetic field 45 across the reed switches 47 mechanically connected with the float 42.

It is understood by one of ordinary skill in the art that this embodiment uses a electromechanical sensor 43 to determine the actual level of the fluid level 4 at certain fixed positions determined by the placement of the reed switches 47 within the vertical guide tube 40. A reed switch 47 is a small, open conductor cable placed in a glass bubble 46 where both magnetized ends of the conductor are normally in an open position. The floater 42 is hollowed and contains air or any fluid of a lighter density than the fluid 3 in order to ensure that the floater 42 remains on the surface 4 of the fluid. As disclosed in FIGS. 17-18, a magnet 45 is connected to the floater 42. In one preferred embodiment, the magnet 45 is located inside the floater 42 and is in contact with the inner section of the floater 42 at its midsection. Once the floater 42 reaches a certain predetermined level, the magnet 45 magnetizes the small conductors, which then close the electrical circuit via two cables 51, 52 and send a certain signal to a detector 49 associated with the selected reed switch 47. Unlike the measure of a variation in capacitance as disclosed in the other embodiments, this embodiment produces a signal directly associated with a fluid level. This embodiment also comprises a container progressively filled with fluid 3 in order to change the fluid level 4. When the fluid conductively connects a first fraction of the first surface contact area 15 and a second fraction of the second surface contact area 101, and wherein the change in fluid level changes the float 42 position along the guide 40 to move the means for establishing a magnetic field 45 and close a reed switch 47 associated with a determined fluid level. The capacitance sensor 41 as shown in FIG. 16 also includes a means for energizing the first body 21 and the second body at a voltage using electrical connectors 11, 13. The means for detecting the variability in voltage 20 as the level of fluid 4 in the container changes as the first fraction of the first surface contact area 15. The second fraction of the second surface contact area changes 101 with the change in the fluid level 4, and a means 49 such as a detector or any other means for determining which reed switch 47 is closed and creates a voltage as the level of the fluid in the container changes. The determination of the level based on the means for determining which reed switch 47 is closed is used to correct the determination of the level of fluid based on the means for detecting the variability of the voltage by fixing known step levels. FIG. 17 shows a electromechanical sensor 43 where the vertical tube 40 is closed by a cap 50 to prevent the fluid 3 from entering the guide 40 as the level of fluid rises.

In another embodiment, shown as FIG. 18, the first body 1 is the circular guide 40 of the electromechanical sensor 43. The first body 1 is covered with a layer of insulation 26. This embodiment is equipped with the same level of means of measure and voltage as disclosed in the present embodiment with the only variation that the capacitance sensor 41 is merged into the electromechanical sensor 43. It is understood by one of ordinary skill in this art that while the first body 1 may be taken as the guide 40, the geometry of the floater 42 must provide a sufficient passage of water in order to offer proper capacitance measurement.

Certain embodiments include in one embodiment thereof a circular vertical probe 40 made of stainless steel covered in the fifth embodiment by a layer of insulating Teflon® 26. In one embodiment, the reed switches 47 are separated vertically by 4 inches and the container of the second contact surface 2 of the container is the inside wall of the container 101. In yet another embodiment, the fluid is water and the means for establishing a magnetic field is a ring magnet 45 located in the center of the floater 42. It is also contemplated that other means for establishing a magnetic field be used, such as a localized current, a magnet, or a magnetic element located on the surface of the water. In another embodiment, the floater 42 is made of a hollowed volume made of stainless steel. It is understood by one of ordinary skill in the art that while a stainless steel floater is shown, any type of floater in any noncorrosive material in contact with the fluid 3 is contemplated.

Figure 19:
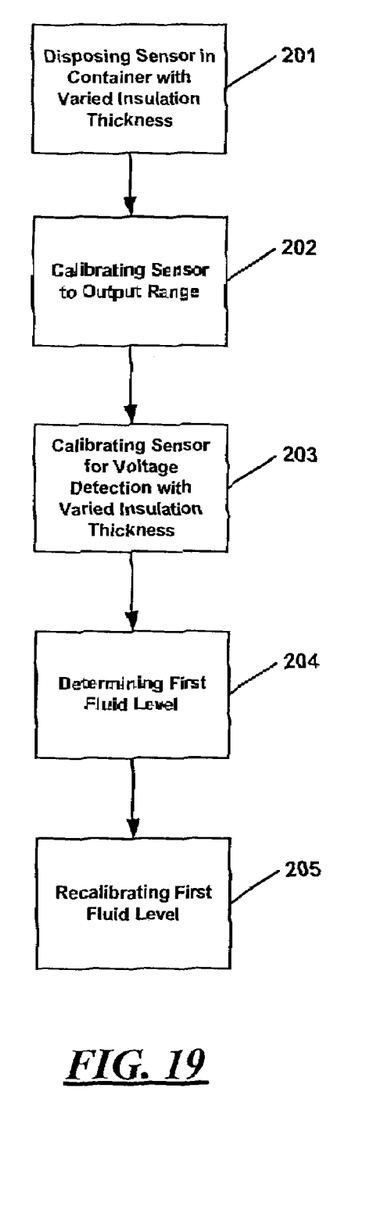
FIG. 19 is a block diagram of the method for measuring a fluid level in a container with a self-calibrating sensing apparatus in accordance with one embodiment of the present disclosure.

FIG. 19 discloses a first method for measuring the fluid level in a container with a self-calibrating sensing apparatus in accordance with one embodiment of the present disclosure. The self-calibration is obtained by conducting a first step where the capacitance sensor of the first embodiment is placed in the container where a lower measure point is in contact with a low level of a fluid to be measured and the higher measure point is in contact with a high level of the fluid to be measured 201, a calibration of the capacitance sensor to the desired output range is then performed so the lower measure point is a first extremity of the output range and the high measure point is a second extremity of the output range 202. The capacitance sensor and means for detecting the variability of the voltage using a determination method to recognize variations associated with the successive levels in the step function associated with the changes in thickness of the insulation are then calibrated in order to determine precise fluid levels associated with each successive level in the step function 203. The capacitance sensor first determines a first level of the fluid based on the measured output voltage in an analog fashion 204, and the capacitance sensor is recalibrated at the successive levels in the step function each time the output voltage based with the precise fluid levels is detected 205.

One of ordinary skill in the art recognizes that an analog measure over a range can be recalibrated by the input of a predetermined value at a predetermined time and that such recalibrations are done using two distinct measures of voltage variability. For example, if the lower point corresponds to a fluid level of 2 inches and the high level corresponds to 20½ inches the successive levels in the step function of 4 inch and ½ inch as described in a preferred embodiment of the first embodiment, that imposes variations in slope at 6, 6½, 10½, 11, 15½, 16, and 20½ inches, respectively. As the level of fluid rises, the analog measure gives a fluid level reading based on its extrapolation of the variability of the capacitance over a possible output of 4-20 mA if a standardized probe is used. For example, if the level reaches 5.95 inches, the analog measure may read 5.85 or 6.05 based on the changes in the fluid characteristics. Using the self-calibrating function, if the measure level is above 6.00 inches, it gives a 6-inch reading and waits for the recognized variation associated with the level 6 inches before it proceeds further along its analog reading using the determined level to recalibrate the precise fluid level. If the analog measure is less than 6 inches, the recalibration waits until the recognized variation associated with the level 6 inches is activated, recalibrates the level at 6 inches, and proceeds along its programmed calibrated range with this new fixed value. It is understood by one of ordinary skill in the art that the use of a secondary measure to calibrate a first measurement may be done using a plurality of different algorithms, all of which relate to using the measured voltage of a second sources to rectify a measure from a first source.

Figure 20:
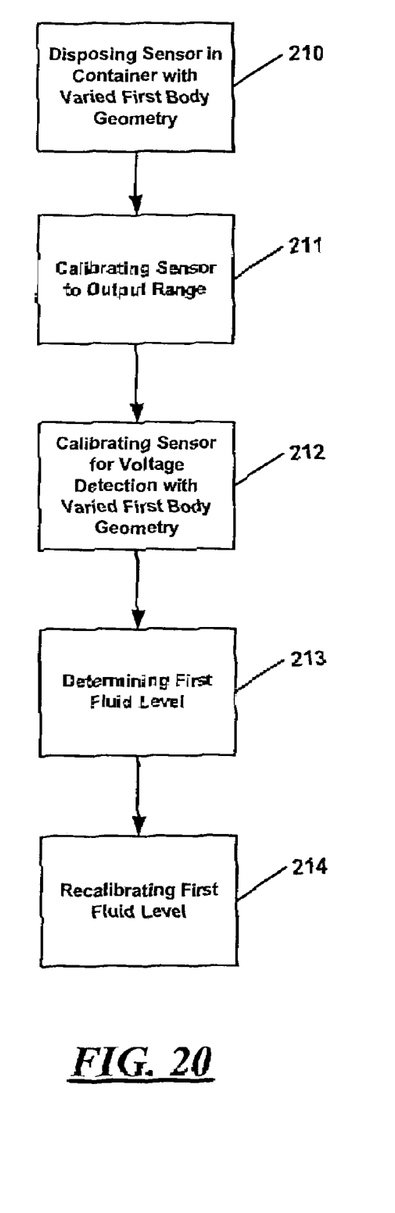
FIG. 20 is a block diagram of the method for measuring a fluid level in a container with a self-calibrating sensing apparatus in accordance with one embodiment of the present disclosure.

A second method for measuring the fluid level in a container with a self-calibrating sensing apparatus in accordance with one embodiment of the present disclosure is shown in FIG. 20. The method comprises the steps of placing the capacitance sensor in the container where a lower measure point is in contact with a low level of a fluid to be measured and the higher measure point is in contact with a high level of the fluid to be measured 210, calibrating the capacitance sensor to the desired output range so the lower measure point is a first extremity of the output range and the high measure point is a second extremity of the output range 211, calibrating the capacitance sensor and means for detecting the variability of the voltage using a determination method to recognize variations associated with the successive levels in the step function associated with the changes in irregular geometry in order to determine precise fluid levels for recalibration associated with each successive levels in the step function 212, determining a first level of the fluid based on the measured output voltage of the capacitance sensor 213, and recalibrating the first level of fluid associated with the measured output voltage based with the precise fluid levels 214.

Figure 21:
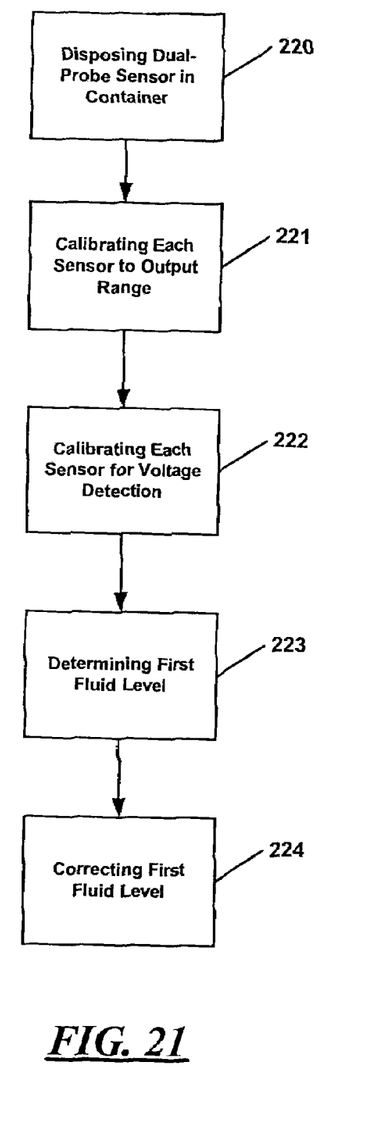
FIG. 21 is a block diagram of the method for measuring a fluid level in a container with a dual probe self-calibrating sensing apparatus in accordance one third embodiment of the present disclosure.

A third method for measuring the fluid level in a container with a self-calibrating sensing apparatus in accordance with one embodiment of the present disclosure is shown in FIG. 21. The method comprises the steps of placing a dual-probe capacitance sensor in the container where a lower measure point of each probe is in contact with a low level of a fluid to be measured and the higher measure point of each probe is in contact with a high level of the fluid to be measured 220, calibrating each of the two capacitance sensors to the desired output range so the lower measure point is a first extremity of the output range and the high measure point is a second extremity of the output range 221, calibrating the means for detecting the variability of the voltage in the third body using a determination method to recognize irregularities in voltage associated with the irregularities in the geometry and associating a fixed fluid level with the irregularities in geometry 222, determining a first level of the fluid based on the measured output voltage of the first capacitance sensor probe of a regular geometry 223, and correcting the first level of fluid associated with the measured output voltage of the first probe of the capacitance sensor to the fixed fluid level determined by second probe of the capacitance sensor based on the fluid level associated with the selected irregularities 224.

Figure 22:
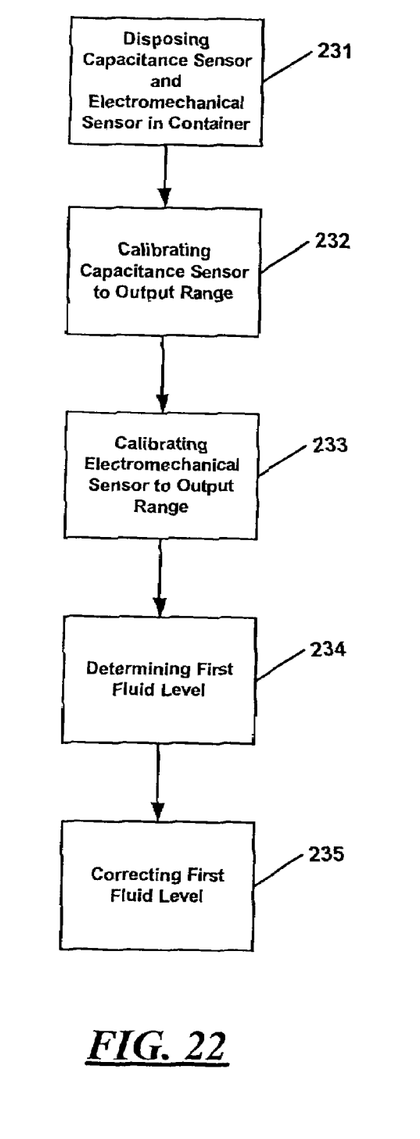
FIG. 22 is a block diagram of the method for measuring a fluid level in a container with a capacitance and electromechanical self-calibrating sensing apparatus in accordance with one embodiment of the present disclosure.

A fourth method for measuring the fluid level in a container with a self-calibrating sensing apparatus in accordance with one embodiment of the present disclosure is shown in FIG. 22. The method comprises the steps of placing the capacitance sensor and the electromechanical sensor in the container where a lower measure point of each sensor is in contact with a low level of a fluid to be measured and the higher measure point of each sensor is in contact with a high level of the fluid to be measured 231, calibrating the capacitance sensor to the desired output range so the lower measure point is a first extremity of the output range and the high measure point is a second extremity of the output range 232, calibrating the electromechanical sensor to the desired output range so a reed switch corresponds to a fixed output voltage located within the output voltage range 233, determining a first level of the fluid based on the measured output voltage of the capacitance sensor 234, and correcting the first level of fluid associated with the measured output voltage of the capacitance sensor to the fluid level determined by the electromechanical sensor based on the fluid level associated with the reed switch, once the fluid level of the reed switch is reached 235. In the fifth embodiment, the first body 1 of the capacitance sensor is the cylindrical sensor probe covered with insulation.

Figure 23:
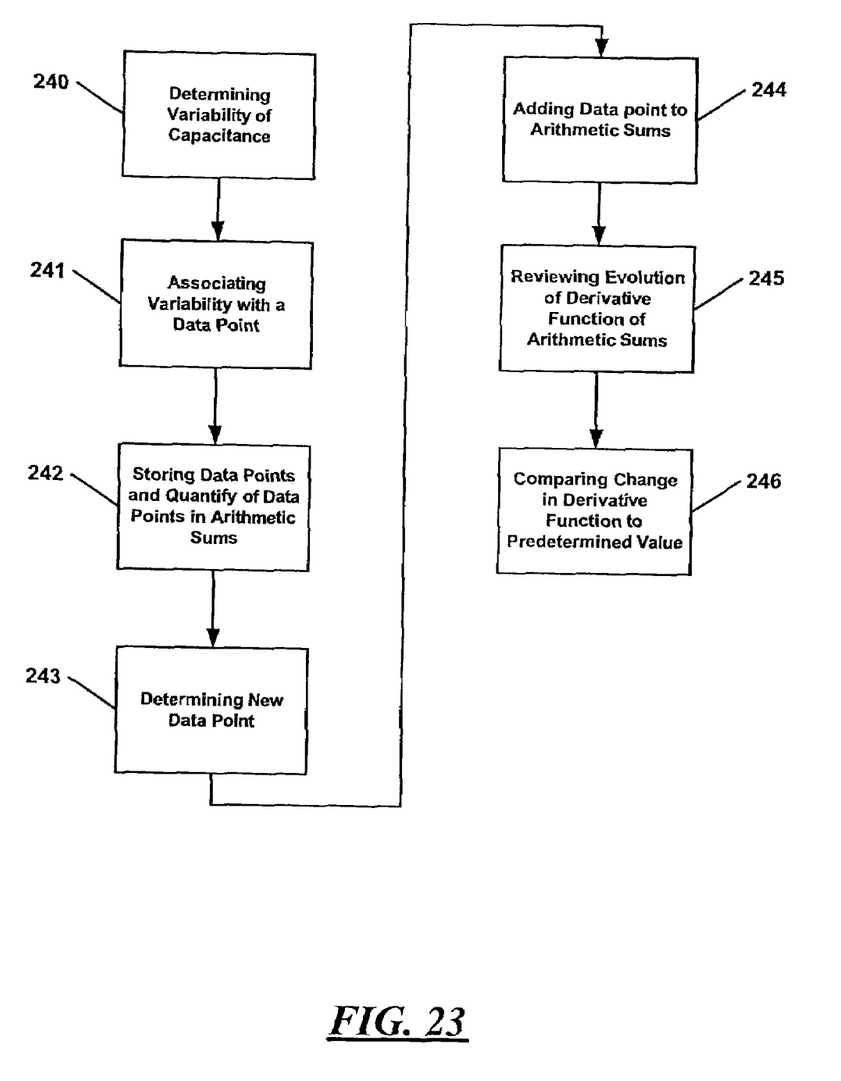
FIG. 23 is a block diagram of the determination method for recognition and quantification of irregularities of a self-calibrating capacitance sensing apparatus in accordance with one embodiment of the present disclosure.

A fifth method is a determination method for recognition and quantification of irregularities of a self-calibrating capacitance sensing apparatus in accordance with one embodiment of the present disclosure is shown in FIG. 23. The determination method comprises the steps of determining a variability in capacitance by measuring and comparing the capacitance over a fixed interval of time 240, associating the variability of capacitance with a data point 241, storing the data points and the quantity of data points in two arithmetic sums 242, determining a new data point to be quantified as a possible irregularity 243, adding the data point to the arithmetic sums 244, reviewing the evolution of a derivative function of the arithmetic sums to determine if a change in slope is observed over a fixed number of sum intervals 245, and comparing the change in the derivative function with a predetermined value to determine if a slope change is observed and if a fixed fluid level is calculated 246.

It is understood by one of ordinary skill in the art that the evolution of the derivative function of the arithmetic sums based on a method such as the arithmetic exponential smoothing method relates to the determination without undue experimentation of a proper time interval of acquisition, a proper time interval for each successive data points, a proper variability of each successive data point at the fixed time interval of acquisition, a determination of an equivalent sum associated with the arithmetic sum, an acceptable number of data points in a new predetermined range in order to determine if a change in slope is determined by determining a certain number of data points to add to the sum, and a value of the new determined slope associated with the change in variability.

Persons of ordinary skill in the art appreciate that although the teachings of the disclosure have been illustrated in connection with certain embodiments and methods, there is no intent to limit the invention to such embodiments and methods. On the contrary, the intention of this disclosure is to cover all modifications and embodiments failing fairly within the scope the teachings of the disclosure.

What is claimed is:

1. A fluid level sensing apparatus for placement in a container comprising:
    a sensor further comprising an electrically conductive first body, an insulating layer having a thickness disposed over the first body to cover a first surface contact area, an electrically conductive second body having a second surface contact area disposed in opposition to the first body;
    a container progressively filled with a fluid in order to change a fluid level, wherein the fluid electrically couples a first fraction of the first surface contact area and a second fraction of the second surface contact area;
    a means for energizing the first body and the second body at a voltage; and
    a means for detecting the variability in voltage as the fluid level changes, wherein the thickness of the insulating layer varies along the first surface contact area as the level fluid changes to create forced variations in the voltage detected by the means for detecting the variability of the voltage.

2. The fluid level sensing apparatus of claim 1, wherein the thickness is varied vertically along a step function.

3. The fluid level sensing apparatus of claim 2, wherein the step function is made of 4-inch sections of a first thickness separated by 7/16-inch sections of a second thickness.

4. The fluid level sensing apparatus of claim 1, wherein the insulating material is polytetrafluoethylene.

5. The fluid level sensing apparatus of claim 1, wherein the second body is the container and the second surface contact area is the inside wall of the container.

6. The fluid level sensing apparatus of claim 1, wherein the fluid is water.

7. The fluid level sensing apparatus of claim 1, wherein the first body is a cylindrical rod of stainless steel.

8. The fluid level sensing apparatus of claim 1, wherein the means for detecting the variability in voltage comprises the use of exponential smoothing method to determine the changes associated with a fixed fluid level, wherein the fixed level is used to calibrate the fluid level sensing apparatus.

9. The fluid level sensing apparatus of claim 1, wherein the first body geometry is varied vertically along a step function.

10. The fluid level sensing apparatus of claim 2, wherein the step function is made of 4-inch sections separated by 7/16-inch sections.

11. The fluid level sensing apparatus of claim 1, wherein the insulating material is Polytetrafluoethylene.

12. The fluid level sensing apparatus of claim 1, wherein the second body is the container and the second surface contact area is the inside wall of the container.

13. The fluid level sensing apparatus of claim 1, wherein the fluid is water.

14. The fluid level sensing apparatus of claim 1, wherein the means for detecting the variability in voltage comprises the use of exponential smoothing method to determine the changes associated with a fixed fluid level, wherein the fixed level is used to calibrate the fluid level sensing apparatus.

15. A fluid level sensing apparatus for placement in a container comprising:
- a sensor further comprising an electrically conductive first body having an irregular surface geometry, an insulating layer disposed placed over the first body to cover a first surface contact area, an electrically conductive second body having a second surface contact area disposed in opposition to the first body;
- a container progressively filled with a fluid in order to change a fluid level, wherein the fluid electrically couples a first fraction of the first surface contact area and a second fraction of the second surface contact area;
- a means for energizing the first body and the second body at a voltage; and
- a means for detecting the variability in voltage as the fluid level changes, wherein the irregular surface geometry of the first body varies along the first surface contact area as the fluid level changes to create forced variations in the voltage detected by the means for detecting the variability of the voltage.

16. A method for measuring a fluid level in a container using a capacitance sensor, the sensor comprising a first body having an insulation layer having an irregular thickness, and a second body, where the first body is energized by a voltage and disposed in opposition to the second body, a fluid electrically coupling the opposed first and second bodies, and a means for detecting the variability in voltage of the sensor as a fluid level changes to produce a output range, wherein the irregular thickness includes successive levels in a step function, the method comprising the steps of:
- disposing the capacitance sensor in the container so that a lower measure point is in contact with a low fluid level to be measured and the higher measure point is in contact with a high fluid level to be measured;
- calibrating the capacitance sensor to the desired output range so that the lower measure point is a first extremity of the output range and the high measure point is a second extremity of the output range;
- further calibrating the capacitance sensor and means for detecting the variability of the voltage using a determination method to recognize variation associated with the successive levels in the step function associated with the irregular thickness of the insulation in order to determine a precise fluid level for recalibration associated with each successive level in the step function;
- determining a first fluid level based on the measured output voltage of the capacitance sensor;
- recalibrating the first fluid level associated with the measured output voltage based on the precise fluid level.

17. The method of claim 16, wherein the first body of the capacitance sensor is a cylindrical stainless sensor.

18. The method of claim 16, wherein the insulation is polytetrafluoethylene.

19. The method of claim 16, wherein the regular steps in the step function are separated by 4 inches.

20. The method of claim 16, wherein the second body is the fluid container.

21. The method of claim 16, wherein the capacitance sensor output range is 4-20 mA.

22. The method of claim 16, wherein the capacitance sensor output range is 0-5 volts.

23. A method for measuring a fluid level in a container using a capacitance sensor, the sensor comprising a first insulated body having an irregular geometry, and a second body, where the first body is energized by a voltage and disposed in opposition of the second body, a fluid electrically coupling the opposed bodies, and a means for detecting the variability in voltage of the sensor as the fluid level changes to produce a output range, wherein the irregular geometry is made of successive levels in a step function, the method comprising the steps of:
- disposing the capacitance sensor in the container where a lower measure point is in contact with a low fluid level to be measured and the higher measure point is in contact with a high fluid level to be measured;
- calibrating the capacitance sensor to the desired output range so that the lower measure point is a first extremity of the output range and the high measure point is a second extremity of the output range;
- further calibrating the capacitance sensor and means for detecting the variability of the voltage using a determination method to recognize variation associated with the successive levels in the step function associated with the irregular geometry in order to determine a precise fluid level for recalibration associated with each successive level in the step function;
- determining a first level of the fluid based on the measured output voltage of the capacitance sensor;
- recalibrating the first level of fluid associated with the measured output voltage based with the precise fluid level.

24. The method of claim 23, wherein the first body of the capacitance sensor is a cylindrical stainless sensor.

25. The method of claim 23, wherein the insulation is polytetrafluoethylene.

26. The method of claim 23, wherein the regular steps in the step function are separated by 4 inches.

27. The method of claim 23, wherein the second body is the fluid container.

28. The method of claim 23, wherein the capacitance sensor output range is 4-20 mA.

29. The method of claim 23, wherein the capacitance sensor output range is 0-5 volts.

30. A determination method for recognition and quantification of irregularities associated with fixed fluid levels using a capacitance fluid level sensing apparatus, the determination method comprising the steps of:
- determining a variability in capacitance by measuring and comparing the capacitance over a fixed interval of time;
- associating the variability of capacitance with a data point;
- storing the data points and the quantity of data points in two arithmetic sums;
- determining a new data point to be quantified as a possible irregularity;
- adding the data point to the arithmetic sums;
- reviewing the evolution of a derivative function of the arithmetic sums to determine if a change in slope is observed over a fixed number of sum intervals; and
- comparing the change in the derivative function with a predetermined value to determine if a slope change is observed and if a fixed fluid level is calculated.

* * * * *